(12) United States Patent
Lim et al.

(10) Patent No.: US 11,181,611 B2
(45) Date of Patent: Nov. 23, 2021

(54) APPARATUS AND METHOD FOR COMPENSATING FOR RETURN LOSS OF ANTENNA OF RADAR, AND RADAR APPARATUS USING SAME

(71) Applicant: MANDO CORPORATION, Gyeonggi-do (KR)

(72) Inventors: Hae Sueng Lim, Gyeonggi-do (KR); Seong Hee Jeong, Gyeonggi-do (KR); Jae Eun Lee, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 340 days.

(21) Appl. No.: 16/258,540

(22) Filed: Jan. 26, 2019

(65) Prior Publication Data
US 2019/0235048 A1 Aug. 1, 2019

(30) Foreign Application Priority Data
Jan. 29, 2018 (KR) .................. 10-2018-0010880

(51) Int. Cl.
*G01S 7/02* (2006.01)
*H01Q 1/32* (2006.01)
(Continued)

(52) U.S. Cl.
CPC .............. *G01S 7/023* (2013.01); *G01S 7/288* (2013.01); *G01S 7/2813* (2013.01); *G01S 7/35* (2013.01);
(Continued)

(58) Field of Classification Search
CPC .......... G01S 7/023; G01S 7/4017; G01S 7/35; G01S 7/288; G01S 13/931; G01S 13/32;
(Continued)

(56) References Cited

U.S. PATENT DOCUMENTS

| 4,093,948 A * | 6/1978 | Long, III | G01S 7/2813 |
| | | | 342/135 |
| 5,790,597 A * | 8/1998 | Kurokami | H04B 7/005 |
| | | | 375/233 |

(Continued)

FOREIGN PATENT DOCUMENTS

| GB | 2463390 A * | 3/2010 | ............. G01S 7/062 |
| JP | 2003-194924 | 7/2003 | |

(Continued)

OTHER PUBLICATIONS

Office Action dated Aug. 1, 2019 for Korean Application No. 10-2018-0010880 and its English machine translation by Google Translate.
Notice of Allowance dated Feb. 5, 2020 for Korean Application No. 10-2018-0010880 and its English machine translation by Google Translate.

*Primary Examiner* — Olumide Ajibade Akonai
(74) *Attorney, Agent, or Firm* — Ladas & Parry, LLP

(57) ABSTRACT

The present disclosure relates to an antenna return loss compensation apparatus and method of a radar and a radar apparatus using the same. The antenna return loss compensation apparatus may include a compensation information calculator configured to calculate return loss compensation information for compensating for a frequency-band based antenna return loss, and a return loss compensator configured to apply return loss compensation information to a reception signal that is reflected from an object and is received, so as to generate a final reception signal, may calculate and store, in advance, compensation information for a return loss occurring in the antenna, may perform compensation associated with the magnitude of a reception signal when measurement is performed using the radar, so that the reception signal has the same magnitude, whereby a radar's performance deterioration attributable to the return loss of the antenna may be minimized.

20 Claims, 9 Drawing Sheets

(51) Int. Cl.
*G01S 7/288* (2006.01)
*G01S 13/931* (2020.01)
*G01S 13/32* (2006.01)
*G01S 7/28* (2006.01)
*G01S 7/40* (2006.01)
*G01S 7/35* (2006.01)

(52) U.S. Cl.
CPC ............ *G01S 7/4017* (2013.01); *G01S 13/32* (2013.01); *G01S 13/931* (2013.01); *H01Q 1/3241* (2013.01); *G01S 7/2883* (2021.05)

(58) Field of Classification Search
CPC .. G01S 7/2813; G01S 2007/2883; G01S 7/02; G01S 7/41; G01S 13/88; G01S 7/025; G01S 7/4021; G01S 7/356; G01S 7/352; H01Q 1/3241; H01Q 21/065; H04L 25/085
USPC .................................................. 342/189, 165
See application file for complete search history.

(56) References Cited

U.S. PATENT DOCUMENTS

| | | | | |
|---|---|---|---|---|
| 6,738,563 | B1* | 5/2004 | Hager | G01S 7/292 342/147 |
| 8,392,134 | B2* | 3/2013 | Li | G01R 29/105 702/76 |
| 9,407,382 | B1* | 8/2016 | Chukka | H04W 24/02 |
| 2008/0136728 | A1* | 6/2008 | Banba | H03H 7/38 343/861 |
| 2008/0310479 | A1* | 12/2008 | Koslar | H04B 1/692 375/131 |

FOREIGN PATENT DOCUMENTS

| | | |
|---|---|---|
| KR | 10-2007-0009388 | 1/2007 |
| KR | 10-2015-0060255 | 6/2015 |
| KR | 10-2016-0050810 | 5/2016 |
| WO | 2017/099852 | 6/2017 |

* cited by examiner

APPARATUS AND METHOD FOR COMPENSATING FOR RETURN LOSS OF ANTENNA OF RADAR, AND RADAR APPARATUS USING SAME

CROSS REFERENCE TO RELATED APPLICATION

This application claims priority from Korean Patent Application No. 10-2018-0010880, filed on Jan. 29, 2018, which is hereby incorporated by reference for all purposes as if fully set forth herein.

BACKGROUND OF THE INVENTION

1. Field of the Invention

An embodiment of the present disclosure relates to an apparatus and method for compensating for a return loss of an antenna of a radar. Particularly, the embodiment of the present disclosure relates to an apparatus and a method for performing compensation associated with a reception signal due to a difference in radio antenna return loss between frequency bands, and relates to a radar sensor apparatus using the apparatus and the method.

2. Description of the Prior Art

A radar apparatus mounted in a vehicle or the like is widely used as a sensor device for vehicle control. The radar apparatus may transmit electromagnetic waves having a predetermined frequency, receives a signal reflected from an object, and processes the received signal so as to extract the position of the object, speed information, or the like.

The radar used for vehicle control needs to have angular resolution with high resolution, is required to have a mid/long range detection function in order to detect a distant object within a relatively narrow angle range using a single antenna assembly, and needs to include a short range detection function in order to detect a near object within a relatively wide angle range.

However, in the radar apparatus for vehicle, a signal loss frequently occurs while a transmitted signal is reflected from an object and is received, and such signal loss may include a path loss, a return loss, or the like.

Generally, an antenna for a radar is designed to have a different antenna loss value depending on the frequency of a transmitted signal. Accordingly, although the same signal is transmitted or received, the magnitude of the signal may be different depending on the frequency.

Particularly, a frequency modulation continuous wave (FMCW) radar for vehicle transmits signals by linearly changing a frequency value within a frequency band of 76~81 GHz, whereby the power of a signal transmitted or received may vary as the frequency is changed.

Conventionally, a signal within a band showing a small difference in antenna return loss has been used. However, a future radar for vehicle is required to have a more precise range accuracy, that is, it needs to have a wide bandwidth.

Therefore, there is a desire for a method of maintaining reliable performance although a signal in a wide band is transmitted.

Accordingly, the present embodiment provides a method of compensating for a frequency band-based antenna return loss of a radar.

SUMMARY OF THE INVENTION

In this background, an aspect of the present disclosure is to provide a method and apparatus for compensating for a return loss of an antenna in a radar apparatus for vehicle.

Another aspect of the present disclosure is to provide a radar apparatus for calculating return loss compensation information for compensating for a frequency-band based antenna return loss in a radar for vehicle, and for applying the compensation information to a reception signal that is reflected from an object and is received so as to generate a final reception signal.

Another aspect of the present disclosure is to provide a method and apparatus for obtaining a change in the magnitude (amplitude) of a reception signal for each frequency, and performing inverse-compensation on the reception signal using the same, when a radar for vehicle generates return loss compensation information for compensating for a frequency-band based antenna return loss.

Another aspect of the present disclosure is to provide a method and apparatus for calculating envelope information by extracting points each at which the gradient of a reception signal for each frequency is close to 0, and connecting the points, and performing compensation associated with the reception signal using the envelope information, when a radar for vehicle generates return loss compensation information for compensating for a frequency-band based antenna return loss.

As another aspect of the present disclosure is to provide a method and apparatus for measuring power for each frequency on the basis of a fast Fourier transform (FFT) result, calculating a magnitude change curve using the power information for each frequency, and performing compensation associated with a reception signal using the same, when a radar for vehicle generates return loss compensation information for compensating for a frequency-band based antenna return loss.

In accordance with an aspect of the present disclosure, there is provided a radar return loss compensation apparatus in a radar apparatus for vehicle, the radar return loss compensation apparatus including: a compensation information calculator configured to calculate return loss compensation information for compensating for a frequency-band based antenna return loss; and a return loss compensator configured to apply return loss compensation information to a reception signal that is reflected from an object and is received, so as to generate a final reception signal.

In accordance with another aspect of the present disclosure, there is provided a return loss compensation method including: compensation information calculation that calculates return loss compensation information for compensating for a frequency-band based antenna return loss; and return loss compensation that applies the return loss compensation information to a reception signal that is reflected from an object and is received, so as to generate a final reception signal.

The compensation information calculator obtains a change in a magnitude (amplitude) of a reception signal for each frequency, and performs inverse-compensation on the reception signal using the change.

Also, according to a first embodiment, the compensation information calculator may calculate envelope information which is obtained by extracting points each at which the gradient of a reception signal for each frequency is closed to 0, are extracted, and connecting the points, to be return loss compensation information, and the return loss compensator may perform compensation associated with the reception signal using the envelope information.

Also, according to a second embodiment, the compensation information calculator may generate power information for each frequency using the result of performing the fast Fourier transform (FFT) on a reception signal, and may calculate a magnitude change curve to be return loss compensation information, by using the power information for each frequency, to be return loss compensation information. The compensator may perform compensation associated with the reception signal using the magnitude change curve.

According to an embodiment of the present disclosure to be described below, a radar apparatus for vehicle may compensate for a return loss of an antenna, and may improve the performance of a radar.

Also, according to the present embodiment, a signal distortion phenomenon on a chirped signal due to a difference in antenna return loss of an FMCW radar may be eased, and the detection performance of a radar (SNR, distance, speed accuracy, or the like) may be improved.

Also, a difference in performance of a radar may be compensated, the difference in the performance of a radar being caused by a tolerance of a radar antenna when a radar apparatus is manufactured.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
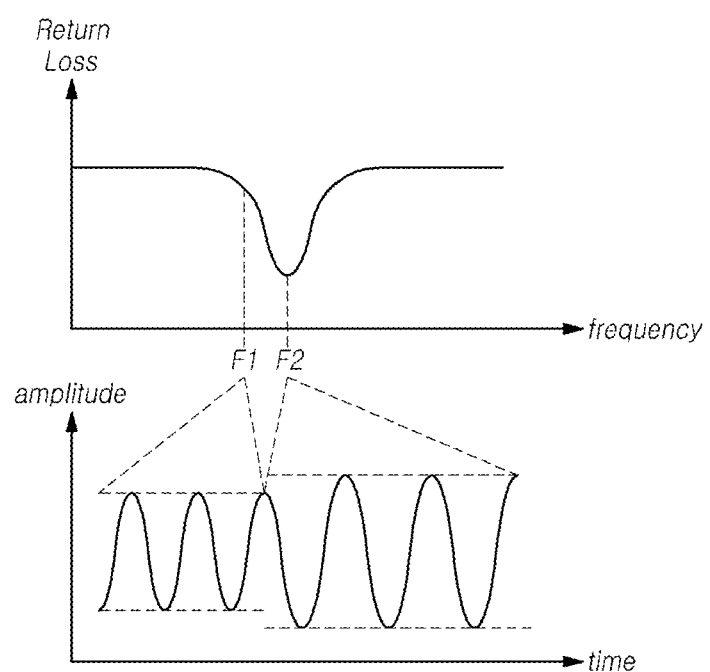
FIG. 1 is a diagram illustrating an antenna return loss occurring in a radar apparatus.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a diagram illustrating an antenna return loss occurring in a radar apparatus.

Generally, the radar apparatus may include: an antenna unit including one or more transmission antennas and one or more reception antennas; one or more switching devices configured to control signal transmission via an antenna; and a signal processor configured to process a reception signal that is reflected from an object and is received, so as to calculate information associated with an object.

A transmission signal is transmitted from one or more transmission antennas using the switching apparatus at a signal transmission point in time, and a reception signal that is reflected from an object is received by one or more reception antennas selected by the switching apparatus at a signal reception point in time.

A signal processor (DSP) amplifies the received reflected signal and compares the same with the transmission signal, so as to measure a change in phase, a change in magnitude, a frequency deviation, or the like, whereby the distance to the object, the relative velocity of the object, or the like may be measured.

In the radar apparatus, a return loss may exist for each antenna due to a difference in feature between antennas.

The return loss by an antenna may be different for each antenna, and may also vary depending on the frequency band of a signal used. Due to the return loss, the magnitude of a reception signal is different for each antenna and/or for each signal frequency band, whereby the radar shows irregular performance.

In order to prevent the radar's performance deterioration attributable to a return loss, a method of transmitting and receiving signals within a frequency band in which antenna return losses are less than a predetermined level and are similar may be used.

However, a recent radar for vehicle needs to have a mid/long range detection function in order to detect a distant object within a relatively narrow angle range using a single antenna assembly, and needs to include a short range detection function in order to detect a near object within a relatively wide angle range.

Also, a legacy radar apparatus is configured in a structure in which a plurality of reception antennas are disposed in order to have an angular resolution with high resolution. That is, the conventional radar apparatus use the structure that increases the angular resolution by arranging a plurality of reception antennas.

As described above, the recent radar for vehicle needs to detect a wide area in a short distance, in addition to a mid/long distance. To this end, a signal in a wide frequency band needs to be used.

When signals in a wide bandwidth are used, the sine wave is obtained in which the power of a reception signal is irregular as shown in FIG. 1.

FIG. 1 is a graph illustrating a frequency-band based antenna return loss. An antenna return loss varies depending on a frequency band used.

For example, a relatively large return loss is shown in frequency F1 and the lowest return loss is shown in frequency F2. Accordingly, the sine wave may be obtained in which the magnitude (power) of a reception signal of frequency F1 is smaller than the magnitude (power) of a reception signal of frequency F2.

Particularly, an FMCW radar uses a signal of which the frequency linearly increases or decreases over time, that is, a chirp signal. When the power of a reception signal is irregular due to an antenna return loss as described above, a main lobe is decreased and a side lobe increases when FFT is performed with respect to the signal, whereby the performance of the radar may deteriorate, which is a drawback.

Accordingly, in order to overcome the radar's performance deterioration attributable to a return loss, an embodiment of the present disclosure provides a method that calculates return loss compensation information for compensating for a frequency-band based antenna return loss, and applying the return loss compensation information to a reception signal that is reflected from an object and is received, so as to generate a final reception signal.

Hereinafter, detailed configuration of the present disclosure will be described with reference to FIGS. 2 to 7.

Figure 2:
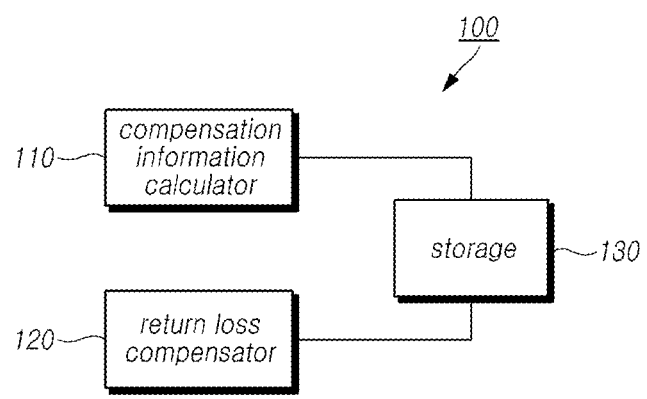
FIG. 2 is a functional block diagram of a return loss compensation apparatus of a radar according to the present embodiment.

FIG. 2 is a functional block diagram of a return loss compensation apparatus 100 of a radar according to the present embodiment.

The return loss compensation apparatus 100 of the radar according to the present embodiment may include a compensation information calculator 110 that calculates return loss compensation information for compensating for a frequency-band based antenna return loss, and a return loss compensator 120 that applies the return loss compensation information to a reception signal that is reflected from an object and is received, so as to generate a final reception signal.

Also, the return loss compensation apparatus 100 may further include a storage 130 for storing return loss compensation information calculated by the compensation information calculator 110 in the form of a table or the like.

The return loss compensation information according to the present embodiment may be frequency-band based signal magnitude information of a signal used for each antenna, or may be a compensation value for performing compensation in association with the signal magnitude information, and the return loss compensation information may be generated/stored in the form of a compensation table but the present disclosure is not limited thereto.

The compensation information calculator 110 performs a function of obtaining magnitude (amplitude) change information of a reception signal for each frequency for each antenna. The compensation information calculator 110 may be implemented as shown in two embodiments below, but the present disclosure is not limited thereto.

According to a first embodiment, the compensation information calculator 110 may calculate envelope information by extract points each at which the gradient of a reception signal for each frequency is close to 0, and connecting the points, to be return loss compensation information. Return loss compensation information at a desired frequency may be extracted by using return loss information in the form of an envelope, without measuring the intensity of a reflected signal at the predetermined frequency.

Also, according to a second embodiment, the compensation information calculator 110 may generate power information for each frequency using the result of performing the fast Fourier transform (FFT) on a reception signal for each frequency, and may calculate a magnitude change curve of a reception signal using the power information for each frequency, to be return loss compensation information. The return loss compensation information according to the second embodiment may be generated/used in the form of a table in which a predetermined frequency and a return loss value or a return loss compensation value are matched to each other, but the present disclosure is not limited thereto.

The calculation of return loss compensation information, and the reception signal compensation method using the same according to the first embodiment and the second embodiment will be described in detail with reference to FIGS. 3 and 4.

The calculation of return loss compensation information by the compensation information calculator 110 may be performed during a calibration process after the radar is produced or during a process of correcting a mismatch for each hardware channel of the radar, or the like, but the present disclosure is not limited thereto. The calculation of return loss compensation information may be performed while the radar is utilized, or may be performed repeatedly at regular intervals.

The return loss compensator 120 may apply, to a reception signal, return loss compensation information calculated while the radar is used for driving a vehicle or the like, so as to generate a final reception signal.

More particularly, the return loss compensator 120 extracts return loss compensation information for each frequency, which is stored in association with an antenna that receives a reception signal, in the process in which the radar actually detects an object such as driving a vehicle or the like, and increases the magnitude of the reception signal by a decrease in the magnitude of the reception signal corresponding to the return loss compensation information, so as to generate a final reception signal.

For example, when the frequency of a used signal is 76 GHz, a reflected signal is received via antenna A, and return loss compensation information stored in association with antenna A at the corresponding frequency is 0.2, a function of increasing the magnitude of the reception signal by 20% may be performed.

That is, the return loss compensation information used in the present embodiment may be information that is proportional to a decrease in the amplitude of a reception signal received by a corresponding antenna in a corresponding frequency band, and the return loss compensator 120 may increase the amplitude of the reception signal by the return loss compensation information.

Via the process, the magnitudes of reception signals of various frequency bands received by various antennas may be compensated on the basis of an equivalent condition, whereby reception signal irregularity attributable to a return loss and the radar's performance deterioration resulting therefrom may be prevented.

Figure 3:
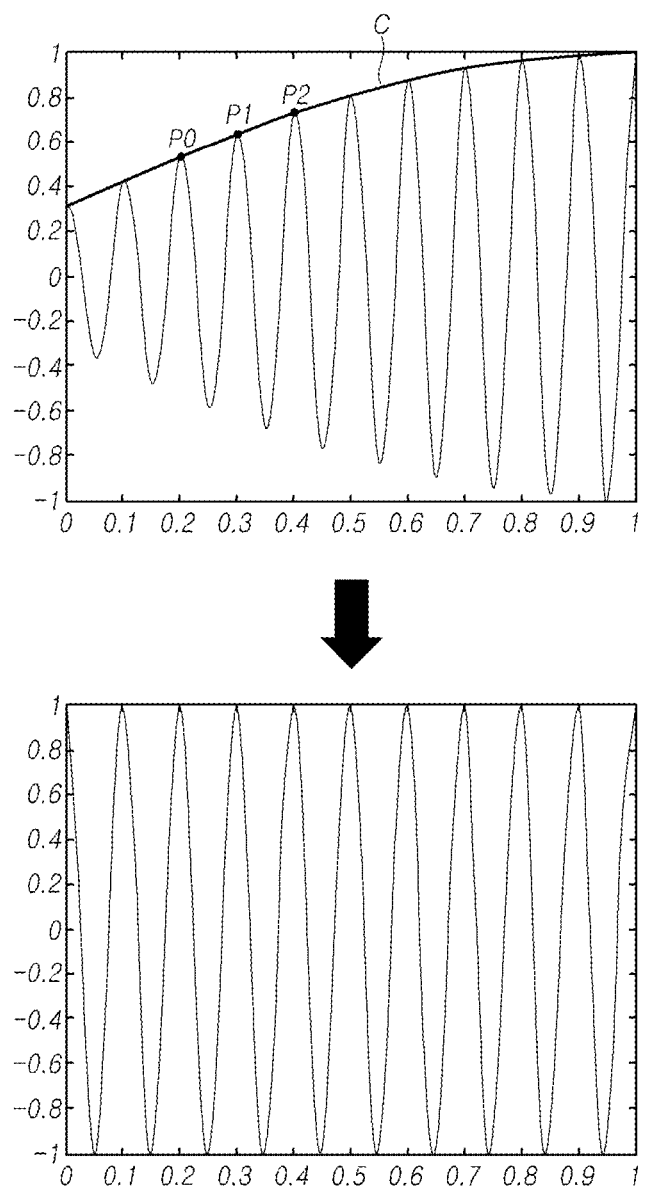
FIG. 3 is a diagram illustrating a scheme of calculating return loss compensation information according to a first embodiment.

FIG. 3 is a diagram illustrating a scheme of calculating return loss compensation information according to a first embodiment.

The first embodiment extracts envelope information from the sine wave of a reception signal received by an antenna, and calculates, using the extracted envelope information, return loss compensation information that enables the sine wave to have the same magnitude.

Particularly, as illustrated in FIG. 3, when a reception signal of which the amplitude is irregular is detected, points each at which the gradient is close to 0, are extracted from the sine wave, envelope information is generated by connecting the points, and return loss compensation information is generated using the envelope information.

The upper graph in FIG. 3 is the waveform of a reception signal before compensation, and shows that the amplitude is irregular. Points each at which the gradient is close to 0, are extracted from the waveform, that is, P0, P1, P2 . . . , and the like corresponding to the peak and the valley of the sine wave, and envelope curve C is generated by connecting the points.

Using the envelope curve C or the envelope information, the amount of decrease in magnitude of a reception signal is obtained for each frequency, and return loss compensation information is generated so as to compensate for the decrease in magnitude, whereby a reception signal may have the same magnitude for each frequency band.

Particularly, when the envelope curve C as shown in the upper drawing of FIG. 3 is used, a return loss value or a return loss compensation value at a desired frequency may be extracted via interpolation, although a return loss is not measured for each frequency.

In the graph on which the envelope curve C is plotted, the X-axis indicates standardized frequency values, and the Y-axis indicates the relative value of the amplitude of a reception signal to the amplitude of a transmission signal.

In this instance, the envelope curve C is a curve obtained by connecting points having a gradient of 0 in the waveform, and points between the points having a gradient of 0 may be interpolated.

Therefore, the Y-axis value corresponding to the X-axis value at a predetermined frequency may be extracted from the envelope curve C. Accordingly, even through a return loss is not measured for each frequency, a return loss value or a return loss compensation value at a desired frequency may be extracted from the envelope curve C generated by interpolation.

The lower graph of FIG. 3 is the waveform of a reception signal after compensation is performed in association with a reception signal using return loss compensation information, and shows that the magnitude or the amplitude of a reception signal is regular.

In order to perform loss compensation according to the first embodiment, the compensation apparatus according to the present embodiment may further include a low pass filter (LPF) which can filter out only a signal of a target.

That is, by passing a reception signal through the LPF, only a signal of a target is extracted, and return loss compensation may be performed by extracting envelope information as described in FIG. 3.

As described above, the first embodiment of the present disclosure may generate return loss compensation information corresponding to envelope information generated from the waveform of a reception signal for each frequency and for each predetermined antenna, and may compensate for the return loss of a reception signal received via a corresponding antenna of the radar, using the generated return loss compensation information, so as to generate a final reception signal. Accordingly, the radar's performance deterioration attributable to the return loss of an antenna may be minimized.

Figure 4:
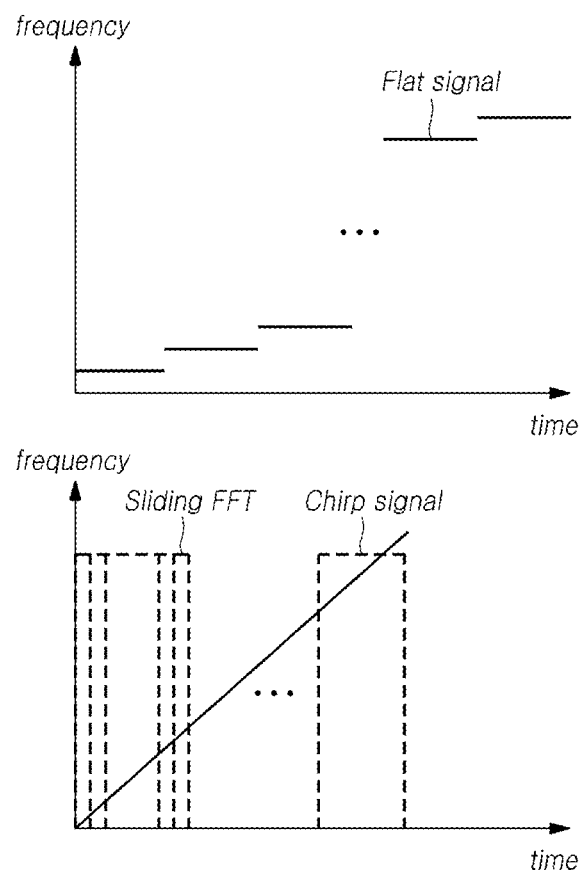
FIG. 4 is a diagram illustrating a scheme of calculating return loss compensation information according to a second embodiment.

FIG. 4 is a diagram illustrating a scheme of calculating return loss compensation information according to a second embodiment.

The second embodiment may generate power information for each frequency using the result of performing fast Fourier transform (FFT) on a reception signal for each frequency, may generate a magnitude change curve or a table including variations in magnitude of a reception signal using the power information for each frequency, and may calculate return loss compensation information using the same.

The calculation of return loss compensation information according to the second embodiment may be implemented by two schemes. A first scheme uses a flat signal having a constant frequency over time as shown in the upper diagram of FIG. 4, perform FFT on each flat signal and obtains a gain for each frequency from the FFT power of each signal, and obtains amplitude (magnitude) change information or an amplitude (magnitude) change curve of a reception signal for each frequency using the gain.

In this instance, the amplitude (magnitude) change information of a reception signal for each frequency may be stored in the form of a lookup table including the amplitude value or return loss value of a reception signal for each frequency.

In this instance, the flat signal may include a Doppler frequency.

The compensation information calculator 110 may generate return loss compensation information corresponding to the calculated signal magnitude change information for each frequency.

That is, the amplitude value or return loss value of a reception signal corresponding to a used frequency is extracted from a lookup table or an amplitude change curve, and return loss compensation information may be calculated based on the extracted value.

For example, when it is assumed that the gain of a frequency band where return loss does not exist at all is 1.0, and the FFT gain value of a flat signal at predetermined frequency F0 is 0.8, the return loss compensation information at the corresponding frequency F0 is set to +0.2 or +20%.

Subsequently, when a corresponding antenna receives a signal in the frequency band F0, the return loss compensation information is applied to the received signal and a final reception signal of which the amplitude is increased by 20% may be generated and used.

Also, another example of the calculation of the return loss compensation information according to the second embodiment uses a chirp signal of which the frequency changes in proportion to or inverse-proportion to time, as shown in the lower diagram of FIG. 4. The calculation performs sliding FFT on a chirp signal, obtains a gain for each frequency from FFT power of each signal, and obtains amplitude (magnitude) change information or an amplitude (magnitude) change curve of a reception signal for each frequency using the obtained gain.

In this instance, the amplitude (magnitude) change information of a reception signal for each frequency may be stored in the form of a lookup table including the amplitude value or return loss value of a reception signal for each frequency.

The compensation information calculator 110 may generate return loss compensation information corresponding to the calculated signal magnitude change information for each frequency.

Particularly, the amplitude value or return loss value of a reception signal corresponding to a used frequency is extracted from a lookup table or an amplitude change curve, and return loss compensation information may be calculated based on the extracted value.

For example, when it is assumed that the gain of a frequency band where return loss does not exist at all is 1.0, and the sliding FFT gain value of a chirp signal at predetermined frequency F1 is 0.9, the return loss compensation information at the corresponding frequency F1 is set to +0.1 or +10%.

Subsequently, when a corresponding antenna receives a signal in the frequency band F1, the return loss compensation information is applied to the received signal and a final reception signal of which the amplitude is increased by 10% may be generated and used.

In the second embodiment, amplitude change information calculated for each frequency or return loss compensation information corresponding thereto may be stored in the storage 130 in the form of a table or the like, and may be used by the return loss compensator 120 during a signal processing process by the radar.

The process of measuring a change in gain for each frequency or a change in amplitude for each frequency on the basis of FFT or sliding FFT according to the second embodiment is performed, and calculating return loss compensation information on the basis of the measurement, may be performed in a process of calibration after manufacturing a radar apparatus or a process of compensating for mismatch for each hardware channel.

As described above, the second embodiment of the present disclosure may generate amplitude change information for each frequency or return loss compensation information corresponding thereto, by measuring the FFT power information of a flat signal or the sliding FFT power information of a chirp signal for each frequency and for each predetermined antenna, and may compensate for the return loss of a reception signal received via a corresponding antenna of a radar, using the generated information, so as to generate a final reception signal. Accordingly, the radar's performance deterioration attributable to the return loss of an antenna may be minimized.

The compensation information calculator 110, the return loss compensator 120, and the like included in the radar return loss compensation apparatus according to the above-described present embodiment may be implemented as a part of the modules included in the radar control apparatus that identifies an object using the radar or as a part of the modules of an ECU.

The radar apparatus or ECU may include a processor, a storage device such as a memory or the like, and a computer program or the like which is capable of performing a predetermined function. Each of the compensation information calculator 110, the return loss compensator 120, and the like described above may be implemented as a software module that is capable of performing a unique function.

Also, the radar return loss compensation apparatus according to the present embodiment may be implemented as a part of the radar sensor apparatus, but the present disclosure is not limited thereto. The radar return loss compensation apparatus may be implemented as one module of a driver assistance system of a vehicle or as a part of the modules of a domain control unit that perform integrated-control of a plurality of driver assistance systems.

Figure 5:
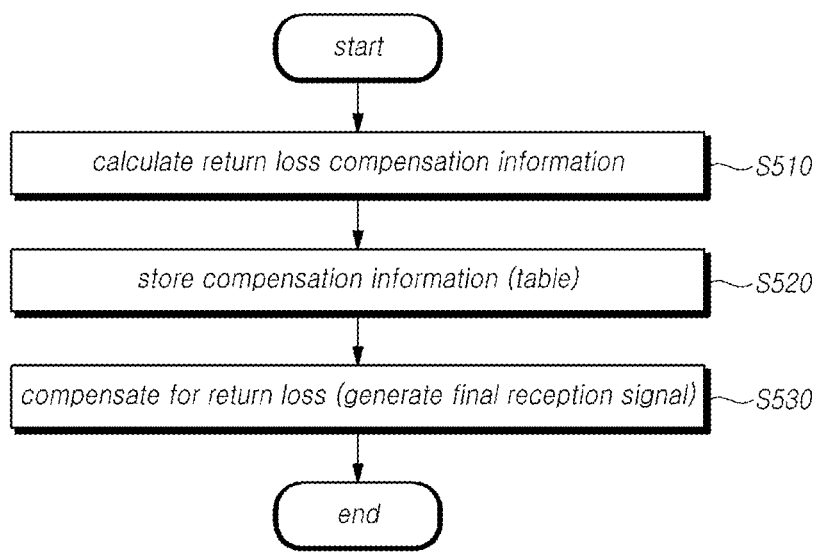
FIG. 5 is a flowchart illustrating a radar return loss compensation method according to the present embodiment.

FIG. 5 is an overall flowchart illustrating a radar return loss compensation method according to the present embodiment.

The radar return loss compensation method according to the present embodiment may include compensation information calculation operation S510 that calculates return loss compensation information for compensating for a frequency-band based antenna return loss, and return loss compensation operation S530 that applies the return loss compensation information to a reception signal that is reflected from an object and is received, so as to generate a final reception signal.

Also, the radar return loss compensation method may further include return loss information storage operation S520 that stores the return loss compensation information calculated by the compensation information calculation operation in the form of a table or the like.

As described above, the return loss compensation information may be frequency-band based signal magnitude information of a signal used for each antenna, or a compensation value for performing compensation associated with signal magnitude information. The compensation information calculation operation may be implemented by two embodiments provided below, but the present disclosure is not limited thereto.

The first embodiment may extract points each at which the gradient of a reception signal for each frequency is close to 0, and may calculate envelope information obtained by connecting the points, to be return loss compensation information.

Also, the second embodiment may generate power information for each frequency using the result of performing the fast Fourier transform (FFT) on a reception signal for each frequency, and may calculate a magnitude change curve of a reception signal using the power information for each frequency, to be return loss compensation information.

The detailed configuration associated with the calculation of return loss compensation information according to the first embodiment and the second embodiment has been described on the basis of FIGS. 3 and 4, and thus, detailed descriptions thereof will be omitted to avoid redundant description.

The return loss compensation operation S530 may apply, to a reception signal, return loss compensation information calculated while the radar is used for driving a vehicle or the like, so as to generate a final reception signal.

More particularly, the return loss compensation operation extracts return loss compensation information for each frequency, which is stored in association with an antenna that receives a reception signal, from a storage or the like in the process in which the radar actually detects an object, and increases the magnitude of the reception signal by a decrease in the magnitude of the reception signal which corresponds to the return loss compensation information, so as to generate a final reception signal.

By using the final reception signal of which the return loss is compensated by the compensation operation, the location information, speed information or the like of the object may be obtained according to a scheme to be described with reference to FIG. 8.

As described above, according to the method of the present embodiment, compensation information for a return loss occurring by an antenna is calculated and stored in advance, and the magnitude of a reception signal is compensated to have the same magnitude when measurement is performed using the radar. Accordingly, the radar's performance deterioration attributable to a return loss of an antenna may be minimized.

Figure 6:
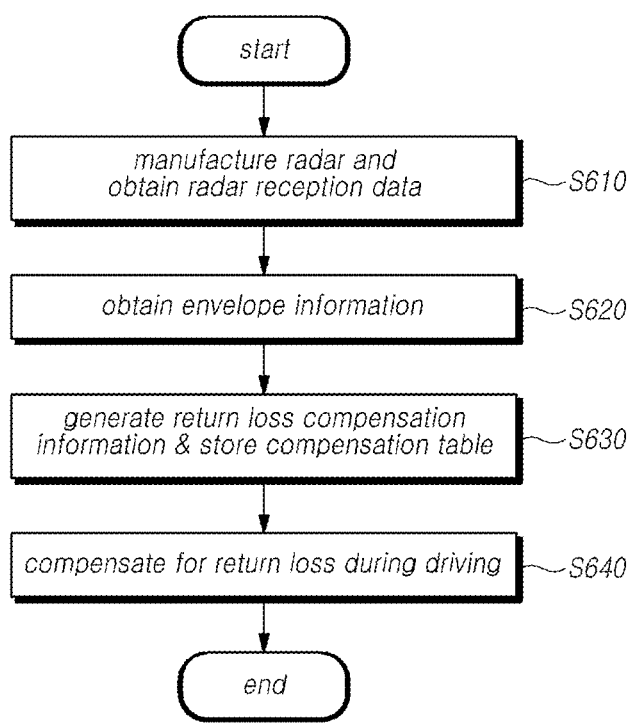
FIG. 6 is a flowchart illustrating a detail of a return loss compensation method according to the first embodiment.

FIG. 6 is a flowchart illustrating a detail of a return loss compensation method according to the first embodiment.

The return loss compensation method according to the first embodiment may manufacture a radar and obtain reception data of the radar in operation S610, and may generate an envelope curve or envelope information by connecting points each at which the gradient of the signal waveform is close to 0, as described in FIG. 3 in operation S620.

The envelope information is information indicating the degree of a decrease in amplitude of a radar reception signal due to a return loss of an antenna. Return loss compensation information is generated for each frequency on the basis of the envelope information, and may be stored in the form of a compensation table in operation S630.

Subsequently, in the process of actually measuring an object using the radar such as when driving a vehicle, the return loss compensation may be performed that generates a final compensation signal by applying return loss compensation information to the reception signal in operation S640.

That is, return loss compensation information corresponding to the frequency of the reception signal is extracted from a storage or the like, the amplitude (magnitude) of the actual reception signal is amplified by the amount corresponding to the return loss compensation information, so as to generate a final reception single, and information associated with an object is obtained on the basis of the final reception signal.

Figure 7:
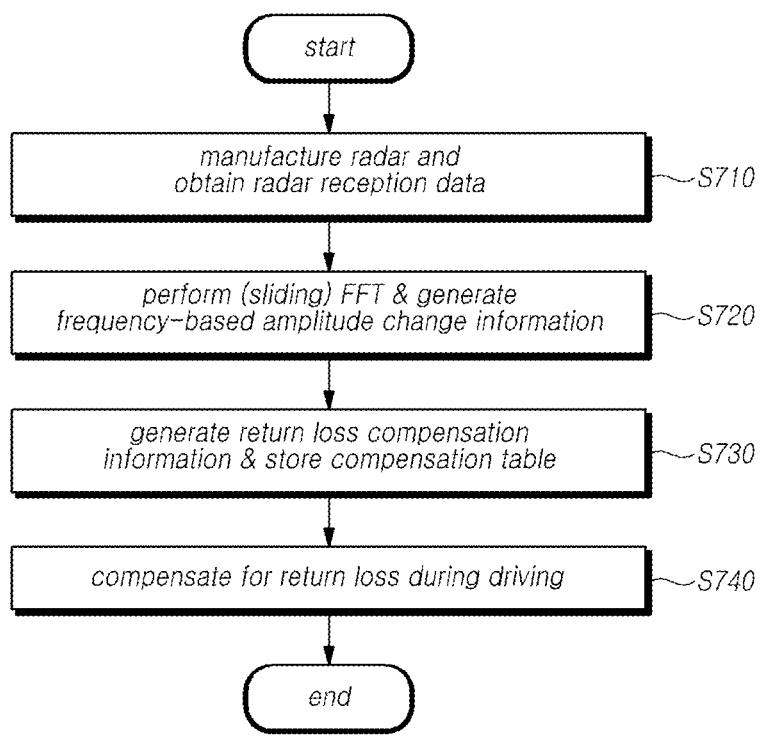
FIG. 7 is a flowchart illustrating a detail of a return loss compensation method according to the second embodiment.

FIG. 7 is a flowchart illustrating a detail of a return loss compensation method according to the second embodiment.

The return loss compensation method according to the second embodiment manufactures a radar and obtains the reception data of the radar in operation S710, obtains a gain for each frequency from FFT power by performing FFT on a flat signal (a signal having the constant frequency over time) or obtains a gain for each frequency by performing sliding FFT on a chirp signal (a signal having a frequency that increases or decreases over time), as described in FIG. 4, and generates amplitude (magnitude) change information or an amplitude (magnitude) change curve of a reception signal for each frequency using the obtained gain operation S720.

The frequency-based amplitude change information is information indicating the degree of a decrease in amplitude of a radar reception signal due to a return loss of an antenna. Return loss compensation information is generated for each frequency on the basis of frequency-based amplitude change information, and may be stored in the form of a compensation table in operation S730.

Subsequently, in the process of actually measuring an object using the radar such as driving a vehicle, the return loss compensation may be performed that generates a final compensation signal by applying return loss compensation information to the reception signal in operation S740.

That is, return loss compensation information corresponding to the frequency of the reception signal is extracted from a storage or the like, the amplitude (magnitude) of the actual reception signal is amplified by the amount corresponding to the return loss compensation information, so as to generate a final reception signal, and information associated with an object is obtained on the basis of the final reception signal.

Figure 8:
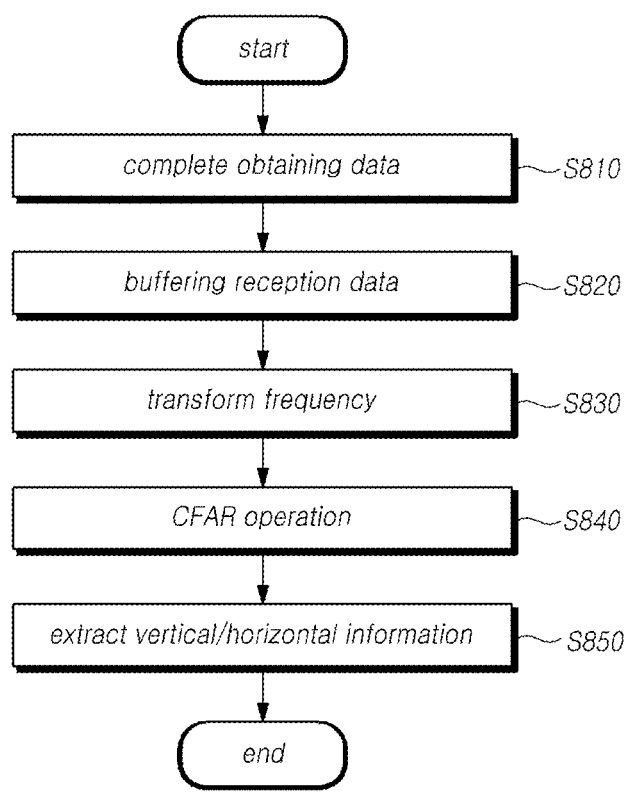
FIG. 8 is a flowchart illustrating a signal processing method of a radar apparatus that uses a return loss compensation apparatus according to the present embodiment.

FIG. 8 is a flowchart illustrating a signal processing method of a radar apparatus that uses a return loss compensation apparatus according to the present embodiment.

FIG. 8 is a flowchart illustrating a signal processing process after a final reception signal is generated by return loss compensation as described in FIGS. 5 to 7. The final reception data is obtained in operation S810, data buffering is performed on the final reception data on the basis of a unit sample size which can be processed during a single period in operation S820, and frequency transform is performed in operation S830.

Subsequently, on the basis of the frequency-transformed reception data, constant false alarm rate (CFAR) operation or the like is performed in operation S840, and vertical/horizontal information, speed information, and distance information associated with a target is extracted in operation S850.

The frequency transform in operation S830 may use Fourier transform, such as fast Fourier transform (FFT) or the like.

Figure 9:
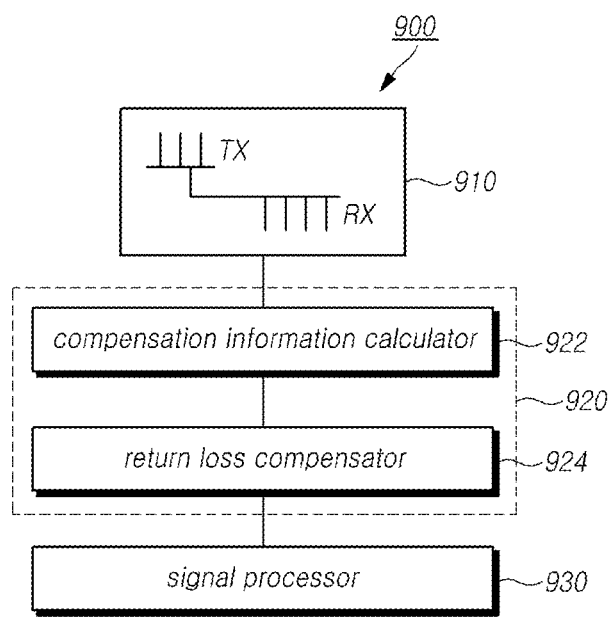
FIG. 9 is a diagram illustrating the configuration of an overall radar apparatus including a return loss compensation apparatus according to the present embodiment.

FIG. 9 is a diagram illustrating the configuration of an overall radar apparatus including a return loss compensation apparatus according to the present embodiment.

A radar apparatus 900 according to the present embodiment may include: an antenna unit 910 including one or more transmission antennas and one or more reception antennas; a return loss compensation apparatus 920 for compensating for an antenna return loss occurring by the antenna unit; and a signal processor 930 for processing a final reception signal generated via compensation performed by the return loss compensation apparatus, so as to obtain information associated with an object.

The antenna unit 910 may include a transmission antenna and a reception antenna. The transmission antenna may include a long-range transmission antenna and a short-range transmission antenna.

Each of the transmission antenna and the reception antenna may include one or more microstripe array antenna elements, but the present disclosure is not limited thereto.

Particularly, the antenna unit according to the present embodiment may include a transmission antenna unit including one or more first transmission antennas and one or more second transmission antennas disposed to be distant by a first vertical distance of B in a first direction which is perpendicular to the ground and the first transmission antennas, and may include a reception antenna unit including one or more reception antennas disposed in the vertical position which is the same as that of the first transmission antenna.

As described above, two transmission antennas are disposed in the first direction that is perpendicular to the ground at intervals of a predetermined vertical distance, a transmission signal is transmitted via the two transmission antennas at the same time, and a signal reflected from an object is received and processed, whereby both horizontal information and vertical information associated with the object may be obtained in mid/long-range detection mode and a short-range detection mode.

Also, the antenna unit 910 according to another embodiment may include: a transmission antenna unit which includes a first transmission antenna group including a first transmission antenna extending in a first direction of the vertical direction, and a second transmission antenna group including a second transmission antenna and a third transmission antenna that extend in a second direction that is opposite to the first direction and are distant by a first vertical distance from the first transmission antenna; and a reception antenna unit which includes a first reception antenna group including a first reception antenna and a second reception antenna that extend in the first direct, and a second reception antenna group including a third reception antenna and a fourth reception antenna that extend in the second direction and are distant by a second vertical distance from the first reception antenna group.

As described above, some of a plurality of transmission antennas are disposed in the first direction that is perpendicular to the ground, the other transmission antennas are disposed in the second direction that is opposite to the first direction, some of a plurality of reception antennas are disposed in the first direction, the other reception antennas are disposed in the second direction, and a transmission antenna for transmitting a transmission signal and a reception antenna for receiving a signal reflected from an object are appropriately selected, whereby the angular resolution in the horizontal direction and vertical direction may be improved in the mid/long-range detection and the short-range detection.

The structure of the antenna unit of the radar apparatus according to the present embodiment may not be limited to the above-described configuration, and an antenna configured according to another scheme may be used.

A radar sensor may include one or more transmission antennas for transmitting a radar signal, and one or more reception antennas for receiving a signal reflected from an object.

The radar sensor according to the present embodiment may adopt a signal transmission/reception scheme of the multiple input multiple output (MIMO) and a multidimensional antenna array in order to form a virtual antenna aperture greater than a real antenna aperture.

For example, a two-dimensional antenna array may be used to obtain horizontal and vertical angular accuracy and resolution. When the two-dimensional radar antenna array is used, signals are transmitted and received via separate (time-multiplexing) scanning two times, horizontally and vertically, and MIMO may be used separately from two-dimensional radar horizontal and vertical scanning (time-multiplexing).

More particularly, the radar sensor according to the present embodiment may adopt a two-dimensional array configuration including a transmission antenna unit that includes a total of 12 transmission antennas (Tx) and a reception antenna unit that includes a total of 16 reception antennas (Rx). Therefore, there are a total of 192 virtual reception antenna dispositions.

In this instance, the transmission antenna unit includes three transmission antenna groups including four transmission antennas. A first transmission antenna group is vertically spaced a predetermined distance from a second transmission antenna group. The first or the second transmission antenna group is horizontally spaced a predetermined distance (D) from a third transmission antenna group.

Also, the reception antenna unit may include four reception antenna groups including four reception antennas. Each reception antenna group is disposed to be vertically spaced apart. The reception antenna unit may be disposed between the first transmission antenna group and the third transmission antenna group which are disposed to be horizontally spaced apart.

Also, according to another embodiment, the antennas of the radar sensor may be disposed in a two-dimensional antenna array. As an example, antenna patches are disposed in a rhombus grid and unnecessary side lobe may be reduced.

Alternatively, the two-dimensional antenna array may include a V-shape antenna array in which a plurality of radiation patches are disposed in the V-shape. More particularly, two V-shape antenna arrays may be included. In this instance, single feed may be performed to the apex of each V-shape antenna array.

Alternatively, the two-dimensional antenna array may include an X-shape antenna array in which a plurality of radiation patches are disposed in the X-shape. More particularly, two X-shape antenna arrays may be included. In this instance, single feed may be performed to the center of each X-shape antenna array.

Also, the radar sensor according to an embodiment may use a MIMO antenna system in order to implement vertical and horizontal sensing accuracy or resolution.

More particularly, in the MIMO system, each transmission antenna transmits a signal having an independent waveform which is distinguished from others. That is, each transmission antenna transmits a signal having an independent waveform which is distinguished from signals from other transmission antennas, and each reception antenna may determine which transmission antenna transmits a signal reflected from an object on the basis of the distinguished waveforms of the signals.

Also, the radar sensor according to an embodiment may include a radar housing that accommodates a circuit and a substrate including transmission/reception antennas, and a radome that forms the exterior of the radar housing. In this instance, the radome is formed of materials which may reduce the attenuation of a transmitted or received radar signal. The radome may include the front and rear bumpers of a vehicle, a grille, a side car body, or the external surface of an element of a vehicle.

That is, the radome of the radar sensor may be disposed inside the grille, bumper, body of the vehicle, and the like. The radome is disposed in a part of an element that forms the external surface of a vehicle, such as a part of the grille, bumper, and the body of the vehicle, whereby the vehicle may have an esthetically improved appearance and the radar sensor may be conveniently installed.

The radar sensor or the radar system used in the present disclosure may include at least one radar sensor unit, for example, one or more sensor units from among a front sensing radar sensor installed in the front side of a vehicle, a rear radar sensor installed in the back side of the vehicle, and a lateral or rear-lateral sensing radar sensor installed in each lateral side of the vehicle. The radar sensor or the radar system analyzes a transmitted signal and a received signal, performs data processing, and detects information associated with an object. To this end, the radar sensor or radar system may include an electronic control unit (ECU) or a processor. Data transmission or signal communication from the radar sensor to the ECU may use a communication link such as a suitable vehicle network bus or the like.

The radar sensor apparatus according to the present embodiment may further include a signal transceiver that controls transmission and reception of a radar signal, and the signal transceiver may transmit a linear frequency modulation signal via an antenna unit under the control of the signal processor 930, and may receive a signal reflected from an object.

Particularly, the signal transceiver may include a voltage controlled oscillator (VCO) of a transmitting end, a power divider, a power amplifier, and the like.

The voltage controlled oscillator may perform a function of generating the sine wave of a predetermined frequency under the control of a pulse modulation controller, and the power divider may perform switching and a power distribution function to a plurality of transmission antennas or reception antennas.

Also, the power amplifier may perform a function of amplifying the amplitude of a transmission wave transmitted via a transmission antenna.

Also, a reception end may include a low noise amplifier (LNA) that low-noise amplifies a signal received by a reception antenna, a mixer that mixes a transmission signal and a reception signal, and a low frequency pass filter (LPF), or the like.

The mixer performs a function of generating a bit signal by performing convolution on a transmission wave and a reception wave corresponding thereto. The low frequency pass filter may perform a function of passing only a low frequency component corresponding to the bit frequency of a bit signal generated by the mixer.

The signal transceiver may operate under the control of the signal processor 930.

The signal processor 930 may receive a reception signal that is reflected from a target, using each reception antenna, and may calculate information associated with the target (position, speed, angle, or the like) using a reception signal and a transmission signal.

Particularly, according to the return signal loss compensation method of the present embodiment, the signal processor 930 according to the present embodiment applies return loss compensation information of a reception signal so as to generate a final reception signal, may generate a bit signal by mixing the generated final reception signal and a transmission signal, and may calculate information associated with a target on the basis of the bit signal.

The return loss compensation apparatus 920 may be an apparatus that generates return loss compensation information for compensating for a return loss occurring in the antenna unit, and performs compensation associated with a reception signal using the return loss compensation information, and may include, as described in FIGS. 2 to 4, a compensation information calculator 922 that calculates return loss compensation information for compensating for a frequency-band based antenna return loss, and a return loss compensator 924 that applies the return loss compensation information to the reception signal that is reflected from an object and is received, so as to generate a final reception signal.

The compensation information calculator 922 and the return loss compensator 924 may be configured as described in FIGS. 2 to 4 and the like, detailed descriptions thereof will be omitted to avoid redundant description.

As described above, according to the embodiments of the present disclosure, compensation information for a return loss occurring by an antenna is calculated and stored in advance, and the magnitude of a reception signal is compensated to have the same magnitude when measurement is performed using a radar. Accordingly, the radar's performance deterioration attributable to a return loss of an antenna may be minimized.

Particularly, points at each of which the gradient of a reception signal for each frequency is closed to 0 is extracted, power information for each frequency is generated using envelope information obtained by connecting the points or using the result of performing fast Fourier transform (FFT) on the reception signal for each frequency, and return loss compensation information is calculated using a magnitude change curve of the reception signal obtained on the basis of the power information for each frequency, whereby the compensation information for compensating for a return loss of an antenna may be readily calculated.

Accordingly, according to the present embodiments, a radar apparatus for vehicle may compensate for a return loss of an antenna, thereby improving the performance of the radar apparatus.

Also, a signal distortion phenomenon on a chirped signal due to a difference in antenna return loss of an FMCW radar may be eased, and the detection performance of the radar (SNR, distance, speed accuracy, or the like) may be improved.

Also, a difference in performance of a radar may be compensated, the difference in the performance of the radar being caused by a tolerance of a radar antenna when a radar apparatus is manufactured.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure. Further, all structural elements may be implemented in independent hardware respectively, but some or all of the structural elements may be selectively combined and implemented in computer programs which have a program module performing functions of some elements or all elements which are combined in one or more pieces of hardware. Codes and code segments forming the computer program can be easily conceived by an ordinarily skilled person in the technical field of the present disclosure. Such a computer program may implement the embodiments of the present disclosure by being stored in a computer readable storage medium, and being read and executed by a computer. A storage medium for the computer program may include a magnetic recording medium, an optical recording medium, a carrier wave medium and the like.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. An antenna return loss compensation apparatus of a radar, the apparatus being used for a radar apparatus for vehicle and comprising:
    a compensation information calculator configured to calculate return loss compensation information for compensating for a frequency-band based antenna return loss;
    a storage configured to store the return loss compensation information of a plurality of reception signals, wherein each of the return loss compensation information of the plurality of reception signals stored in the storage corresponds to a respective frequency and a respective antenna associated with each of the plurality of reception signals; and a return loss compensator configured to compensate a reception signal, reflected from an object and received, using the stored return loss compensation information corresponding to the reception signal, reflected from the objected and received, to generate a final reception signal.

2. The apparatus of claim 1, wherein the compensation information calculator obtains a change in a magnitude (amplitude) of a reception signal for each frequency, and performs inverse-compensation on the reception signal using the obtained change, so as to generate the final reception signal.

3. The apparatus of claim 2, wherein the compensation information calculator calculates envelope information from a waveform of the reception signal, and generates the return loss compensation information corresponding to the envelope information.

4. The apparatus of claim 3, wherein the envelope information is obtained by extracting points each at which a gradient is 0 from the waveform of the reception signal, and connecting the points.

5. The apparatus of claim 2, wherein the compensation information calculator performs fast Fourier transform (FFT) on a flat signal having a constant frequency over time among reception signals so as to calculate an FFT power, calculates reception signal amplitude change information using the FFT power, and generates the return loss compensation information corresponding to the reception signal amplitude change information.

6. The apparatus of claim 2, wherein the compensation information calculator performs sliding fast Fourier transform (FFT) on a chirp signal having a frequency increasing or decreasing over time among reception signals so as to calculate an FFT power, calculates reception signal amplitude change information using the FFT power, and generates the return loss compensation information corresponding to the reception signal amplitude change information.

7. The apparatus of claim 1, wherein the return loss compensator amplifies a magnitude of the reception signal by an amount corresponding to the return loss compensation information, so as to generate the final reception signal.

8. A radar apparatus, comprising:
an antenna unit comprising one or more transmission antennas and one or more reception antennas;
a return loss compensation apparatus comprising a compensation information calculator configured to calculate return loss compensation information for compensating for a frequency-band based antenna return loss, a storage configured to store the return loss compensation information of a plurality of reception signals, wherein each of the return loss compensation information of the plurality of reception signals stored in the storage corresponds to a respective frequency and a respective reception antenna associated with each of the plurality of reception signals, and a return loss compensator configured to compensate a reception signal, reflected from an object and received, using the stored return loss compensation information corresponding to the reception signal, reflected from the object and received, to generate a final reception signal; and
a signal processor configured to process the final reception signal generated via compensation performed by the return loss compensation apparatus, to obtain information associated with the object.

9. The apparatus of claim 8, wherein the compensation information calculator obtains a change in a magnitude (amplitude) of a reception signal for each frequency, and performs inverse-compensation on the reception signal using the change, so as to generate the final reception signal.

10. The apparatus of claim 9, wherein the compensation information calculator calculates envelope information from a waveform of the reception signal, and generates the return loss compensation information corresponding to the envelope information.

11. The apparatus of claim 10, wherein the envelope information is generated by extracting points each at which a gradient is 0, from the waveform of the reception signal, and connecting the points.

12. The apparatus of claim 9, wherein the compensation information calculator performs fast Fourier transform (FFT) on a flat signal having a constant frequency over time among reception signals so as to calculate an FFT power, calculates reception signal amplitude change information using the FFT power, and generates the return loss compensation information corresponding to the reception signal amplitude change information.

13. The apparatus of claim 9, wherein the compensation information calculator performs sliding fast Fourier transform (FFT) on a chirp signal having a frequency increasing or decreasing over time among reception signals so as to calculate an FFT power, calculates reception signal amplitude change information using the FFT power, and generates the return loss compensation information corresponding to the reception signal amplitude change information.

14. The apparatus of claim 8, wherein the return loss compensator amplifies a magnitude of the reception signal by an amount corresponding to the return loss compensation information, so as to generate the final reception signal.

15. A return loss compensation method of a radar, the method being used for a radar apparatus for vehicle and comprising:
calculating return loss compensation information for compensating for a frequency-band based antenna return loss;
storing the return loss compensation information of a plurality of reception signals, wherein each of the return loss compensation information of the plurality of reception signals stored in a storage corresponds to a respective frequency and a respective antenna associated with each of the plurality of reception signals; and
compensating a reception signal, reflected from an object and received, using the stored return loss compensation information corresponding to the reception signal, reflected from the object and received, to generate a final reception signal.

16. The method of claim 15, wherein the calculating of the return loss compensation information comprises: obtaining a change in a magnitude (amplitude) of a reception signal for each frequency; and performing inverse-compensation on the reception signal using the change so as to generate the final reception signal.

17. The method of claim 16, wherein the calculating of the return loss compensation information comprises: calculating envelope information from a waveform of the reception signal; and generating the return loss compensation information corresponding to the envelope information.

18. The method of claim 16, wherein the calculating of the return loss compensation information comprises: performing fast Fourier transform (FFT) on a flat signal having a constant frequency over time among reception signals so as to calculate an FFT power; calculating reception signal amplitude change information using the FFT power; and generating the return loss compensation information corresponding to the reception signal amplitude change information.

19. The method of claim 16, wherein the calculating of the return loss compensation information comprises: performing sliding fast Fourier transform (FFT) on a chirp signal having a frequency increasing or decreasing over time among reception signals; calculating reception signal amplitude change information using the FFT power; and generating the return loss compensation information corresponding to the reception signal amplitude change information.

20. The apparatus of claim 1, wherein the return loss compensation information of the plurality of reception signals relates to a change in a frequency-based signal amplitude for the respective frequency and the respective antenna associated with each of the plurality of reception signals.

* * * * *